(12) United States Patent
Harris et al.

(10) Patent No.: US 8,517,072 B2
(45) Date of Patent: Aug. 27, 2013

(54) TIRE HAVING GUM STRIP AND CHAFER

(75) Inventors: Bradley J Harris, New London, OH (US); Chris A Swartzwelder, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 334 days.

(21) Appl. No.: 12/700,051

(22) Filed: Feb. 4, 2010

(65) Prior Publication Data

US 2011/0186202 A1 Aug. 4, 2011

(51) Int. Cl.
*B60C 15/00* (2006.01)
*B60C 15/06* (2006.01)
*B60C 9/18* (2006.01)

(52) U.S. Cl.
USPC ............ 152/539; 152/526; 152/536; 152/546

(58) Field of Classification Search
USPC ................................. 152/538, 526
See application file for complete search history.

(56) References Cited

U.S. PATENT DOCUMENTS

| | | | |
|---|---|---|---|
| 3,245,455 A | 4/1966 | Lewis | |
| 3,951,192 A * | 4/1976 | Gardner et al. | 152/379.3 |
| 4,726,408 A * | 2/1988 | Alie et al. | 152/541 |
| 5,221,385 A * | 6/1993 | Hanada et al. | 152/543 |
| 5,253,692 A | 10/1993 | Stephens et al. | |
| 5,261,474 A | 11/1993 | Lobb et al. | |
| 5,361,820 A | 11/1994 | Adachi | |
| 5,379,820 A | 1/1995 | Cesar et al. | |
| 5,385,190 A | 1/1995 | Assaad | |
| 5,427,164 A | 6/1995 | Williams et al. | |
| 5,427,166 A * | 6/1995 | Willard, Jr. | 152/454 |
| 5,538,063 A | 7/1996 | Dwenger et al. | |
| 5,688,343 A | 11/1997 | Minami et al. | |
| 5,743,976 A | 4/1998 | Pena et al. | |
| 5,769,982 A | 6/1998 | De Loze de Plaisanc | |
| 5,820,710 A | 10/1998 | Behnsen et al. | |
| 5,871,602 A | 2/1999 | Paonessa et al. | |
| 5,879,485 A * | 3/1999 | Sakamoto et al. | 152/554 |
| 5,958,163 A | 9/1999 | Kojima | |

(Continued)

FOREIGN PATENT DOCUMENTS

| | | |
|---|---|---|
| EP | 0287497 | 10/1988 |
| EP | 0756950 | 2/1997 |

(Continued)

OTHER PUBLICATIONS

Zibell, Martin, Written Opinion of the International Searching Authority, PCT Application US2011/042313, Oct. 14, 2011, pp. 9-14, European Patent Office, Munich, Germany.

(Continued)

*Primary Examiner* — Justin Fischer

(57) ABSTRACT

A tire having a circumferential tread, at least one belt, an inner liner, a pair of sidewalls, at least one carcass ply, and a pair of bead portions. The pair of bead portions each further includes a bead core, a bead filler having an upper end, a chaffer, and a gum strip. The chaffer extends axially outward from the inner liner towards the sidewall and curves radially upward along an axially outer portion of the bead core. The sidewall gum strip extends radially upward from a curved portion of the chaffer, wherein the sidewall gumstrip is located axially between the at least one carcass ply turn-up end and a sidewall.

13 Claims, 5 Drawing Sheets

(56) References Cited

U.S. PATENT DOCUMENTS

| | | | |
|---|---|---|---|
| 5,971,049 A | 10/1999 | Minami et al. | |
| 6,148,889 A | 11/2000 | Minami et al. | |
| 6,318,431 B1 | 11/2001 | Ueyoko et al. | |
| 6,408,914 B1 | 6/2002 | Lamock et al. | |
| 6,598,646 B1 | 7/2003 | Minami et al. | |
| 6,622,765 B1 | 9/2003 | Corsi | |
| 6,634,397 B1 | 10/2003 | Oare et al. | |
| 6,648,041 B2 | 11/2003 | Ueyoko | |
| 6,659,148 B1 | 12/2003 | Alie et al. | |
| 6,834,698 B2 | 12/2004 | Suzuki et al. | |
| 6,834,699 B2 | 12/2004 | Corsi | |
| 6,840,297 B2 | 1/2005 | Farinola | |
| 6,913,053 B2 | 7/2005 | Reep et al. | |
| 6,972,061 B1 | 12/2005 | Kubinski et al. | |
| 7,040,366 B2 | 5/2006 | Minami et al. | |
| 7,093,635 B2 | 8/2006 | Ueyoko | |
| 7,096,909 B1 | 8/2006 | Ueyoko | |
| 7,100,655 B2 | 9/2006 | Ueyoko | |
| 7,201,199 B2 * | 4/2007 | Tonezzer et al. | 152/539 |
| 7,320,350 B2 | 1/2008 | Wright | |
| 7,503,360 B2 | 3/2009 | Rielly et al. | |
| 7,712,500 B2 * | 5/2010 | Hayashi et al. | 152/532 |
| 7,997,318 B2 * | 8/2011 | Maruoka | 152/541 |
| 2002/0162616 A1 | 11/2002 | Bernard et al. | |
| 2003/0217801 A1 | 11/2003 | Reep et al. | |
| 2005/0045260 A1 | 3/2005 | Maruoka et al. | |
| 2005/0145314 A1 * | 7/2005 | Ikeda et al. | 152/458 |
| 2005/0274444 A1 | 12/2005 | Ueyoko et al. | |
| 2009/0101267 A1 | 4/2009 | Neubauer et al. | |
| 2009/0151843 A1 | 6/2009 | Villanueva | |
| 2009/0151845 A1 | 6/2009 | Skurich et al. | |
| 2010/0024948 A1 | 2/2010 | Westgate et al. | |

FOREIGN PATENT DOCUMENTS

| | | | |
|---|---|---|---|
| EP | 0810107 A2 | | 3/1997 |
| EP | 1201463 | | 2/2002 |
| EP | 1452346 | | 1/2004 |
| GB | 1502654 | * | 3/1978 |
| JP | 07-164813 | | 6/1995 |
| JP | 10-044725 | | 2/1998 |
| JP | 11-170823 | | 6/1999 |
| JP | 2001-233026 | * | 8/2001 |
| JP | 2002-137608 | | 5/2002 |
| JP | 2002-192920 | | 7/2002 |
| JP | 2004-182021 | | 2/2004 |
| JP | 2009-262744 | | 11/2009 |
| KR | 20-0114751 | | 4/1998 |

OTHER PUBLICATIONS

Lee Chang Won, Written Opinion of the International Searching Authority, PCT Application US2011/023313, Sep. 30, 2011, pp. 1-4, Korean Intellectual Property Office, Daejeon, Republic of Korea.
US 2007/0074072 A1, 06/2002, Suzuki et al. (withdrawn)

* cited by examiner

US 8,517,072 B2

TIRE HAVING GUM STRIP AND CHAFER

FIELD OF INVENTION

The present application is directed to tires with a gum strip and flipper in the bead regions. More particularly, the present application is directed to tires with a gum strip and a full flipper in each of the bead regions.

BACKGROUND

In an inflated and loaded condition, a tire is subject to forces that produce strains and stresses in different portions of the tire. Forces in the bead regions of the tire create strains and stresses between the carcass plies and adjacent material components. For example, strains and stresses can build up to elevated levels between the carcass plies and the bead core, bead filler, and sidewall areas of the tire.

SUMMARY

A tire is disclosed herein having a circumferential tread, at least one belt, an inner liner, a pair of sidewalls, and at least one carcass ply. The tire further includes a pair of bead portions, each including a bead core, a bead filler, a chaffer, and a gum strip.

The chaffer extends axially outward from the inner liner towards the sidewall and curves radially upward along an axially outer portion of the bead core. The sidewall gum strip extends radially upward from a curved portion of the chaffer, wherein the sidewall gumstrip is located axially between the at least one carcass ply turn-up end and a sidewall.

BRIEF DESCRIPTION OF THE DRAWINGS

In the accompanying drawings, structures are illustrated that, together with the detailed description provided below, describe exemplary embodiments of a tire having a gum strip and full flipper. One of ordinary skill in the art will appreciate that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Directions are stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
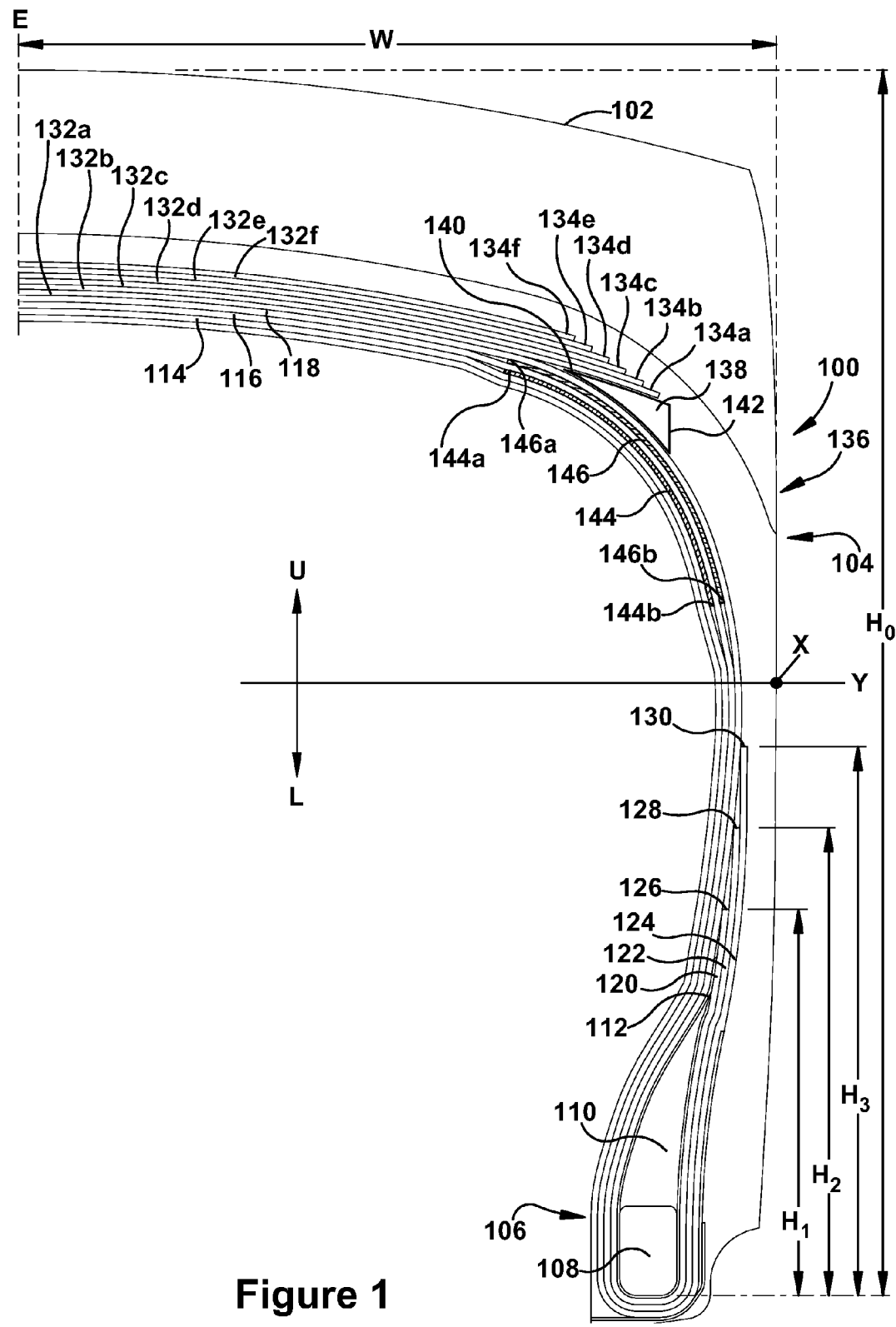
FIG. 1 illustrates a partial cross-section of one embodiment of a tire.

FIG. 1 is a cross-sectional view of half of one embodiment of a tire 100. Although only half of the tire 100 is depicted in the drawings, it will be appreciated that the other half of the tire 100 is a substantial mirror image of the half depicted. The tire 100 has an equatorial plane E and a maximum section width W measured from the equatorial plane E to the outer most point of the tire 100, point X on sidewall. The tire 100 can be divided into two sections—an upper section U and a lower section L. Separating the upper section U from the lower section L is an imaginary line Y drawn through point X that is substantially parallel to the axis of rotation of the tire 100. The upper section U is the portion of the tire 100 that is disposed above point X of the tire 100 (portion above line Y), while the lower section L is disposed below point X of the tire 100 (portion below line Y).

With continued reference to FIG. 1, the tire 100 includes a tread 102 provided in the upper section U of the tire 100, a sidewall 104 provided in both the upper and lower sections U, L of the tire 100, and a bead portion 106 provided in the lower section L of the tire 100. The bead portion 106 includes a bead core 108 and a bead filler 110 having an upper end 112.

The tire 100 also includes first, second, and third carcass plies 114, 116, 118 that extend circumferentially about the tire 100 from one bead portion (e.g., bead portion 106) to the other bead portion (not shown). The first, second, and third carcass plies 114, 116, 118 are wound outwardly about the bead core 108 and extend upwardly towards the tread 102 to form first, second, and third turn-up portions 120, 122, 124, respectively. Each turn-up portion 120, 122, 124 terminates at a turn-up end 126, 128, 130, respectively. Although the tire 100 illustrated in FIG. 1 includes three carcass plies, the tire 100 may include more or less than three carcass plies in alternative embodiments (not shown).

With continued reference to the embodiment illustrated in FIG. 1, first turn-up portion 120 of first carcass ply 114 has a first height $H_1$ measured radially from turn-up end 126 to the base of bead core 108. Second turn-up portion 122 of second carcass ply 116 has a second height $H_2$ measured radially from turn-up end 128 to the base of bead core 108. Third turn-up portion 124 of third carcass ply 118 has a third height $H_3$ measured radially from turn-up end 130 to the base of bead core 108. In the illustrated embodiment, first height $H_1$ is less than second height $H_2$, which is less than third height $H_3$. In alternative embodiments (not shown), first turn-up portion 120 or second turn-up portion 122 may have the greatest height. In other alternative embodiments (not shown), one or more of the turn-up portions may have equal heights. In yet other alternative embodiments (not shown), the heights of the turn-up portions on one side of tire 100 vary from the heights of the turn-up portion on the other side of tire 100, e.g., first height $H_1$ is greater than second height $H_2$ and less than third height $H_3$ on one side of the tire and first height $H_1$ is less than second height $H_2$, which is less than third height $H_3$ on the other side of the tire. Preferably, the heights $H_1$, $H_2$, and $H_3$ of the turn-up portions 120, 122, 124 are between about 10% and about 70% of the section height $H_0$ (which is measured from the outer tread surface at the equatorial plane $E_p$ to the base of the bead core 108). In an alternative embodiment, heights $H_1$, $H_2$, and $H_3$ of the turn-up portions 120, 122, 124 are between about 10% and about 55% of the section height H. In one embodiment, height $H_1$ of first turn-up portion is between about 125 mm and about 280 mm, height $H_2$ of second turn-up portion is between about 70 mm and about 230 mm, and height $H_3$ of the third turn-up portion is between about 70 mm and about 230 mm.

With continued reference to FIG. 1, tire 100 further includes six belts 132a-f that extend circumferentially about tire 100. The belts 132a-f are provided below tread 102 and above first, second, and third carcass plies 114, 116, 118. Further, belts 132a-f terminate at edges 134a-f, respectively, at locations near a shoulder region 136 of tire 100. Although tire 100 illustrated in FIG. 1 features six belts, tire 100 can include less than six belts or more than six belts in alternative embodiments (not shown).

With continued reference to FIG. 1, tire 100 also includes a belt edge insert 138 provided in shoulder region 136 of tire 100 between edges 134a-f of the belts 132a-f, respectively, and first, second, and third carcass plies 114, 116, 118. Belt edge insert 138 extends circumferentially about tire 100, and has an inner end 140 disposed inward of edge 134a of the lowest belt 132a and an outer end 142 disposed outwards from edge 134a of the lowest belt 132a. Placement of the belt edge insert 138 in this location protects carcass plies 114, 116, 118 from the edges of belts 134a-f and maintains a flat, constant belt profile. Belt edge insert 138 may be constructed of extruded rubber. Alternatively, belt edge insert 138 may be constructed of another elastomeric material. Although shown in the FIG. 1 embodiment, the belt edge insert 138 is optional and may be omitted in alternative embodiments (not shown).

As shown in FIG. 1, tire 100 also includes first and second shoulder inserts 144, 146 that extend circumferentially about tire 100. First shoulder insert 144 is provided between first carcass ply 114 and second carcass ply 116. Second shoulder insert 146 is provided between second carcass ply 116 and third carcass ply 118. In the illustrated embodiment, first and second shoulder inserts 144, 146 include upper ends 144a, 146a and lower ends 144b, 146b. Upper ends 144a, 146a of shoulder inserts 144, 146 terminate in the upper section U of tire 100 radially inward of six belts 132a-f. Further, lower ends 144b, 146b of shoulder inserts 144, 146 terminate in the upper section U of tire 100 radially below upper ends 144a, 146a. In an alternative embodiment, at least one of the lower ends 144b, 146b of shoulder inserts 144 146 terminate in the lower section L of tire 100. In another alternative embodiment, only one of the upper ends 144a, 146a of shoulder inserts 144, 146 terminates in the upper section U of tire 100 radially inward of belts 132a-f. In yet another alternative embodiment (not shown), shoulder inserts 144, 146 can extend from one sidewall to another sidewall, and have lower ends 144b, 146b that terminate in the lower section L or upper section U of tire 100. Although tire 100 illustrated in FIG. 1 features two shoulder inserts, tire 100 can include less than two shoulder inserts or more than two shoulder inserts in alternative embodiments (not shown).

Figure 2:
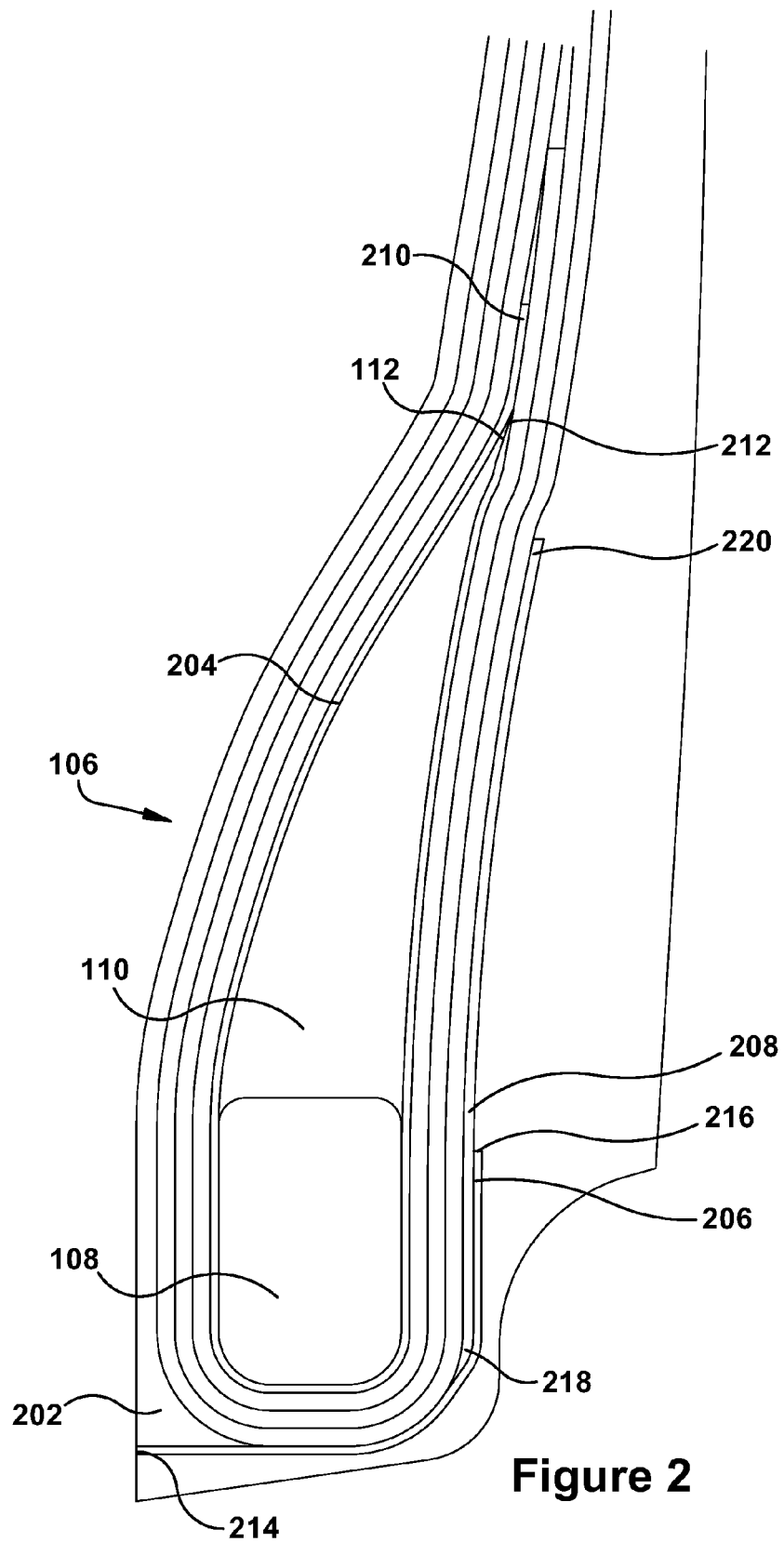
FIG. 2 is an enlarged cross-section of a portion of the tire of FIG. 1.

FIG. 2 is an enlarged cross-section of a portion of tire 100 of FIG. 1 depicting bead portion 106 in the lower section L of tire 100 in greater detail. Bead portion 106 further includes a portion of an inner liner 202, a flipper 204, a chaffer 206, and a sidewall gum strip 208. Flipper 204, chaffer 206, and sidewall gum strip 208 extend circumferentially about tire 100.

Flipper 204 includes a first end 210 and a second end 212. In the illustrated embodiment, first end 210 is radially above upper end 112 of bead filler 110 and extends radially downward along an axially inner perimeter of the bead filler 110, around a perimeter of the bead core 108, radially upward along an axially outer perimeter of the bead filler 110 and terminates at second end 212, radially lower than the first end 210 and in proximity to upper end 112 of bead filler 110. Flipper 204 is made from rubber, providing a cushion between the bead filler 108 and the first, second, and third carcass plies 114, 116, 118. In an alternative embodiment, second end 212 terminates radially above upper end 112 of bead filler 110. In another alternative embodiment, second end 212 terminates radially below upper end 112 of bead filler 110. In yet another alternative embodiment, first end 210 may be axially inward of bead filler top 112.

As shown in the embodiment illustrated in FIG. 2, chaffer 206 includes a first end 214 axially adjacent to inner liner 202. The chaffer 206 extends axially outward from inner liner 202, below bead core 108 and carcass plies 114, 116, 118, and curves upward around bead core 108 and carcass plies 114, 116, 118, terminating axially outward of the sidewall gum strip 208 at second end 216. In the illustrated embodiment, second end 216 of chaffer 206 is located radially downward of the bead filler 110. In an alternative embodiment, second end 216 of chaffer 206 is located radially upward of bead core 108. In yet another alternative embodiment (not shown), first end 214 of chaffer 206 may be positioned at a location between inner liner 202 and carcass plies 114, 116, 118, axially inward of bead core 108 and radially above second end 216 so chaffer 206 includes two curved portions that curve radially upward on each side of bead core 108. Chaffer 206 may be made from nylon, polyester, or the like.

With continued reference to FIG. 2, the sidewall gum strip 208 is located axially between third turn-up portion 124 and a portion of chaffer 206. The sidewall gum strip begins at first end 218, located below the second end 216 of chaffer 206, and extends radially upward, terminating at a second end 220, located radially below the first and second ends 210, 212 of flipper 204 and upper end 112 of bead filler 110. In an alternative embodiment (not shown), second end 220 is located radially upward of upper end 112 of bead filler 110. In another alternative embodiment (not shown), first end 218 of sidewall gum strip 208 is axially outward of second end 216 of chaffer 206. In one embodiment, second end 220 is located about 80 mm to about 125 mm radially above first end 218. In another embodiment, second end 220 is located radially above upper end 112 of bead filler 110.

Figure 3:
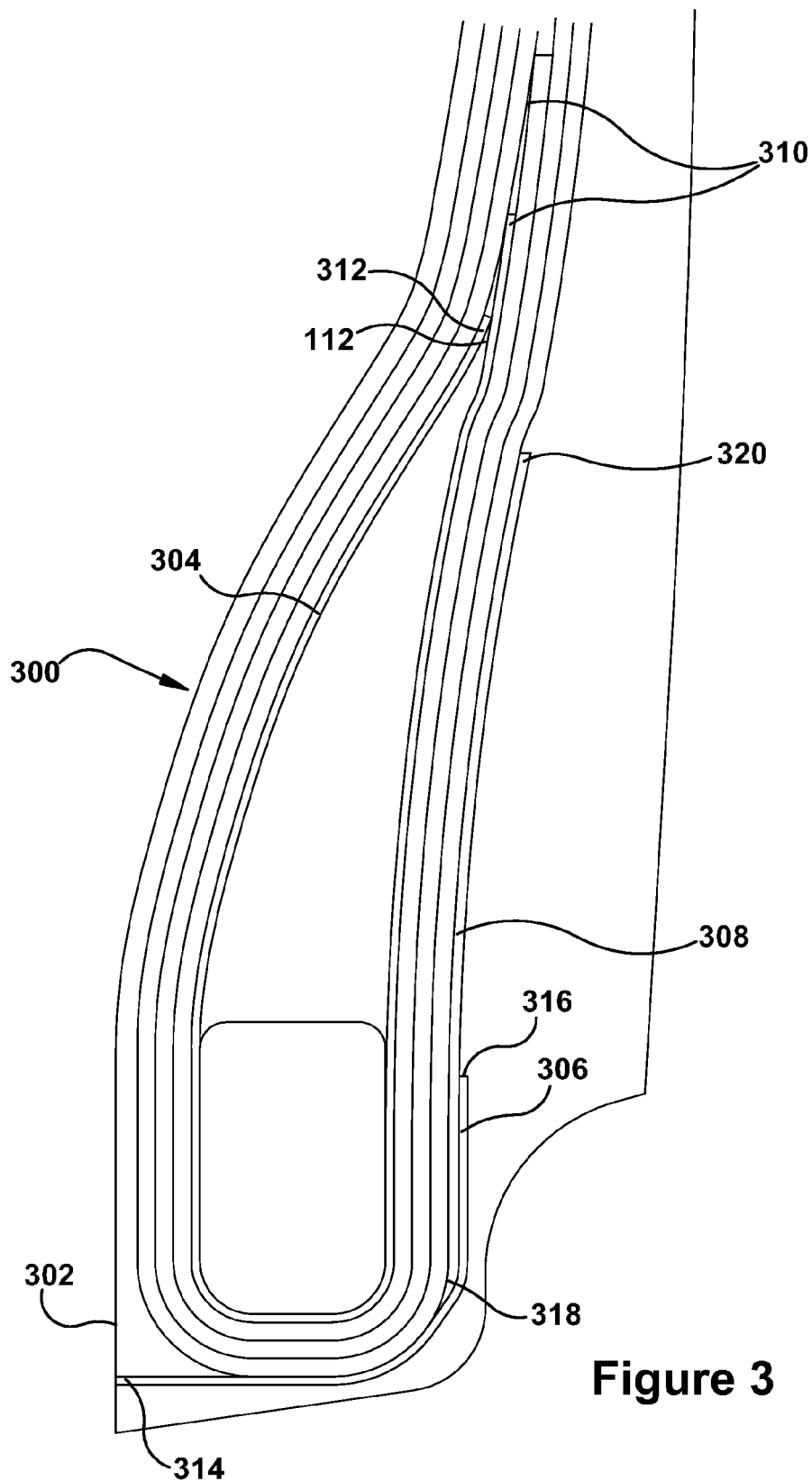
FIG. 3 is an alternative embodiment of the tire illustrated in FIG. 1, illustrating an enlarged cross-section of a portion of the tire.

Illustrated in FIG. 3 is an enlarged perspective view of a portion of the tire 100 of FIG. 1 depicting an alternative bead portion 300 in the lower section L of tire 100 in greater detail. The bead portion 300 includes an inner liner 302, a flipper 304, a chaffer 306 having a first end 314 and a second end 316, and a sidewall gum strip 308 having a first end 318 and a second end 320. Bead portion 300 is substantially identical to the bead portion 106 illustrated in FIG. 2, except for the design of flipper 304. In the illustrated embodiment, flipper 304 includes a first end 310 and a second end 312. First end 310 of flipper 304 is positioned radially above upper end 112 of bead filler 110, extends radially downward along an axially outer perimeter of bead filler 110, around a perimeter of bead core 108, radially upward along an axially inner perimeter of bead filler 110 and terminates at second end 312, radially inward of the first end 310 and in proximity to upper end 112 of bead filler 110. Flipper 304 is made from rubber, providing a cushion between bead core 108 and bead filler 110 and first, second, and third carcass plies 114, 116, 118. In an alternative embodiment, second end 312 terminates radially upward of upper end 112 of bead filler 110. In another alternative embodiment, second end 312 terminates radially downward of upper end 112 of bead filler 110.

Figure 4:
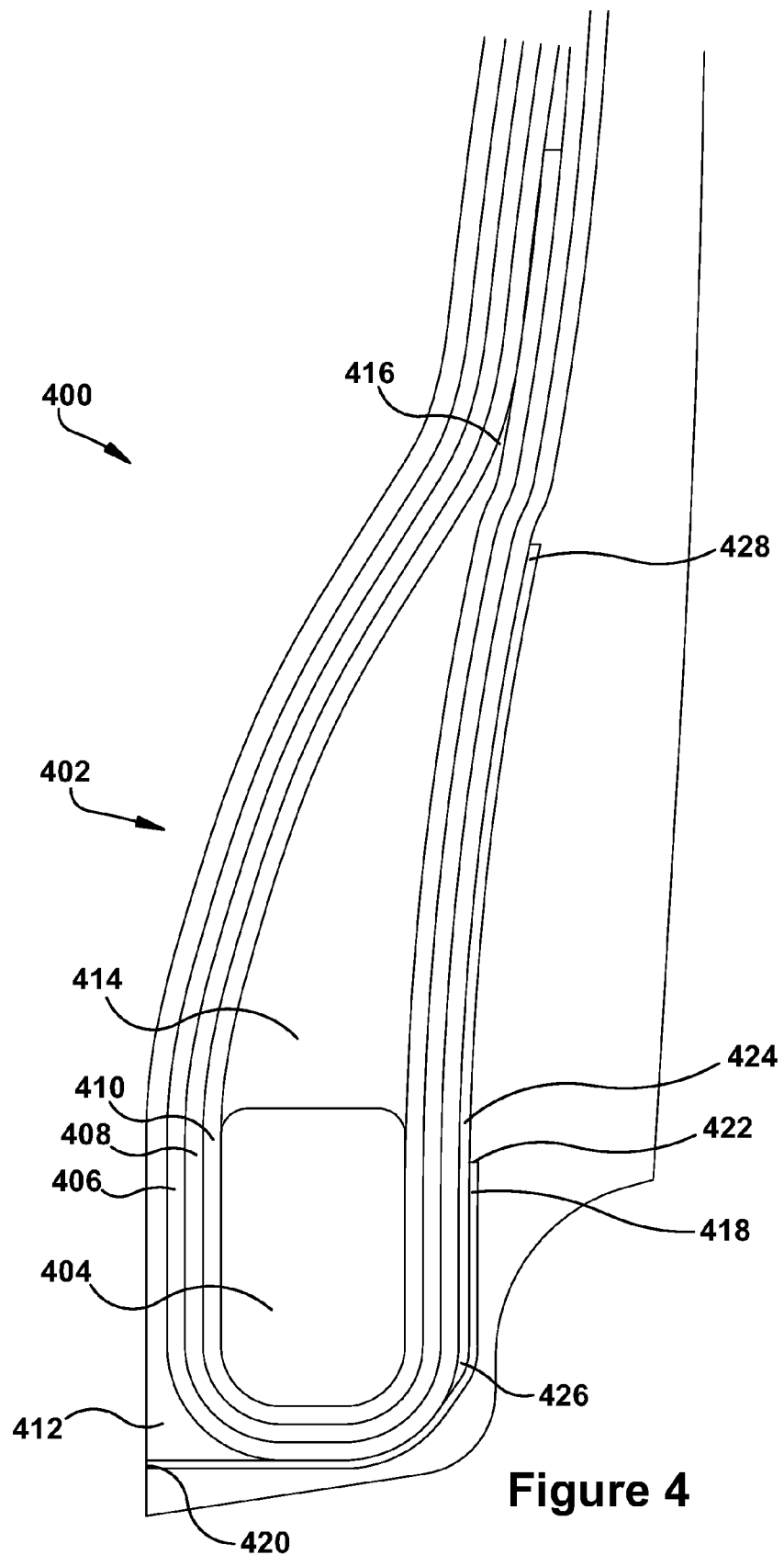
FIG. 4 is an alternative embodiment of a tire, illustrating an enlarged cross-section of a portion of the tire.

FIG. 4 illustrates an enlarged cross-section of a portion of an alternative embodiment of a tire 400, depicting a bead portion 402 in the lower section of tire 400. Bead portion 402 is substantially identical to the bead portion 106 illustrated in FIG. 2, except that bead portion 402 lacks a rubber flipper between a bead filler 404 and first, second, and third carcass plies 406, 408, 410. In the illustrated embodiment, bead portion 406 further includes an inner liner 412, a bead filler 414 having an upper end 416, a chaffer 418 having a first end 420 and a second end 422, and a sidewall gum strip 424 having a first end 426 and a second end 428. Inner liner 412, bead filler insert 414, chaffer 418, and sidewall gum strip 420 extend circumferentially about tire 100.

Figure 5:
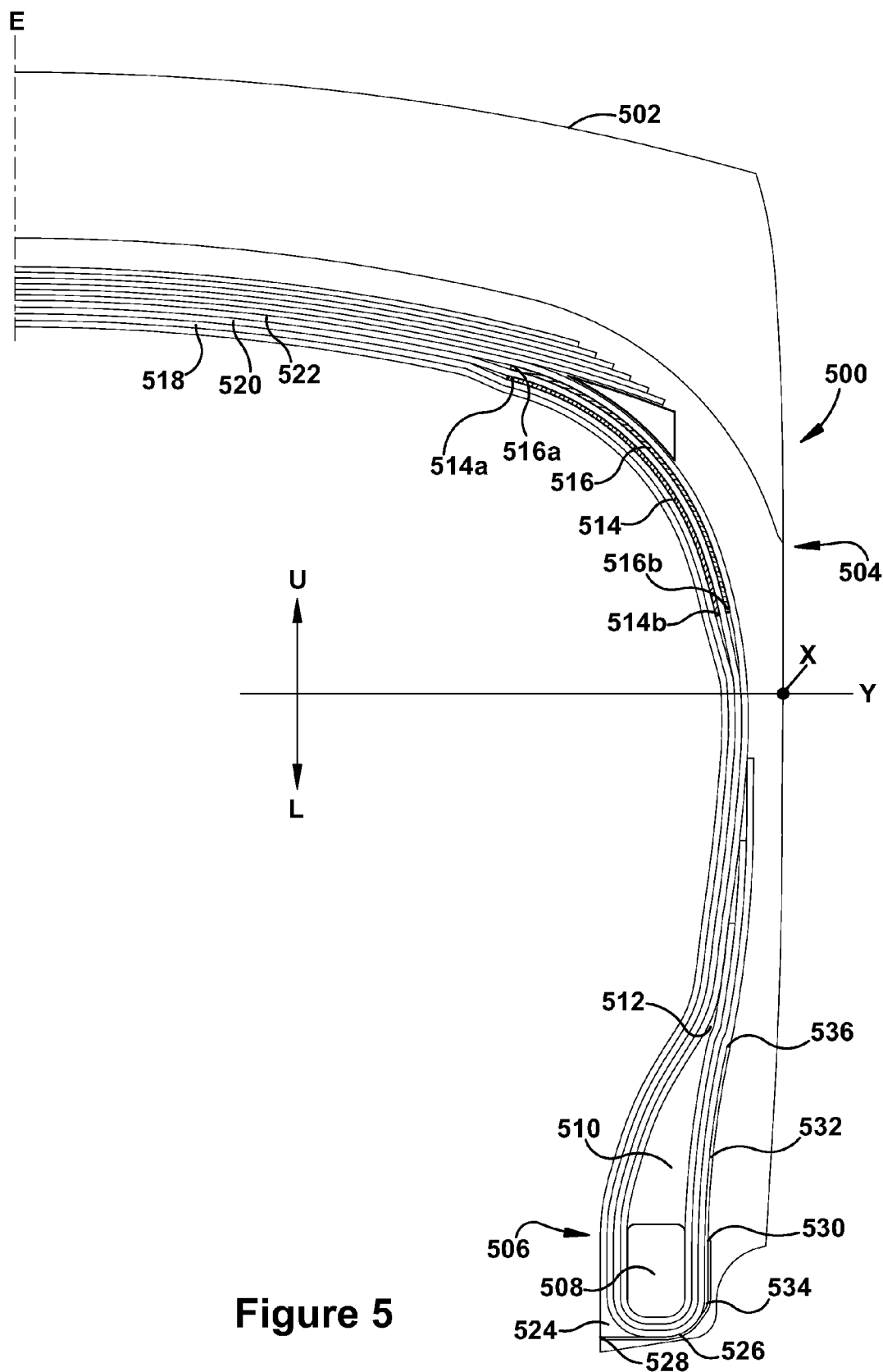
FIG. 5 illustrates a partial cross-section of an alternative embodiment of a tire.

The flipperless bead portion of tire 400 illustrated in FIG. 4 may be employed in a tire having shoulder inserts. FIG. 5 is a partial cross-section of such a tire 500. Tire 500 includes a tread 502 provided in the upper section U of the tire 500, a sidewall 504 provided in both the upper and lower sections U, L of the tire 500, and a bead portion 506 provided in the lower section L of the tire 500. The bead portion 506 includes a bead core 508 and a bead filler 510 having an upper end 512.

Further illustrated in FIG. 5, tire 500 also includes first and second shoulder inserts 514, 516 that extend circumferentially about tire 500. First shoulder insert 514 is provided between a first carcass ply 518 and a second carcass ply 520. Second shoulder insert 516 is provided between a second carcass ply 520 and a third carcass ply 522. In the illustrated embodiment, first and second shoulder inserts 514, 516 include upper ends 514a, 516a and lower ends 514b, 516b. Tire 500 further includes an inner liner 524, a chaffer 526 having a first end 528 and a second end 530, and a sidewall gum strip 532 having a first end 534 and a second end 536. Inner liner 524, chaffer 526, and sidewall gum strip 532 extend circumferentially about tire 500.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described above. Accordingly, departures may be made from such details without departing from the spirit or scope of the applicant's general inventive concept.

What is claimed is:

1. A tire having a section height, a maximum section width, an upper section above the maximum section width, and a lower section below the maximum section width, the tire comprising:
   a circumferential tread;
   at least one belt;
   a pair of sidewalls, each sidewall forming an outermost point of a side of the tire;
   an inner liner;
   a pair of belt edge inserts;
   a pair of bead portions, wherein each bead portion includes a bead core and a bead filler;
   a flipper having a first end axially inward of an upper end of the bead filler, extending from the first end radially downward along an axially inner perimeter of the bead filler and around a perimeter of the bead core, continuing radially upward along an axially outer perimeter of the bead filler, and terminating at a second end axially outward of the upper end of the bead filler;
   at least one carcass ply extending circumferentially about the tire from one bead portion to the other, wherein the at least one carcass ply extends radially downward, axially inward of the flipper, extends around the flipper and the bead core, and continues radially upward, axially outward of the flipper and terminates at a turn-up end;
   at least two shoulder inserts, the at least two shoulder inserts including first and second shoulder inserts extending circumferentially about the tire, the first and second shoulder inserts provided between the inner liner and at least one of the sidewalls of the tire, wherein at least one lower end of the first and second shoulder inserts terminates in the upper section of the tire and upper ends of the first and second shoulder inserts terminate in the upper section of the tire radially below the at least one belt;
   a chafer extending axially outward from the inner liner towards one of the sidewalls and having a curved portion curving radially upward along an axially outer portion of the bead core, wherein the sidewall is located axially outward from and radially below the chafer; and
   a sidewall gum strip extending radially upward from the curved portion of the chafer, wherein the sidewall gum strip is located axially between the at least one carcass ply turn-up end and at least a portion of the chafer such that an outer end of the chafer is axially outside the sidewall gum strip, and wherein the sidewall gum strip further comprises a radially lower end and a radially upper end, where the radially upper end terminates in the upper section of the tire.

2. The tire of claim 1, wherein the tire includes at least four belts.

3. The tire of claim 1, wherein the belt edge inserts are triangular in shape.

4. The tire of claim 1, wherein the first end and the second end of the flipper are at different radial locations.

5. The tire of claim 4, wherein the first end of the flipper extends radially above the second end of the flipper.

6. The tire of claim 4, wherein the second end of the flipper extends radially above the first end of the flipper.

7. The tire of claim 1, wherein the sidewall gum strip has an upper end located radially below the first and second ends of the flipper.

8. The tire of claim 1, wherein the sidewall gum strip has an upper end located radially below the upper end of the bead filler.

9. A tire having a section height, a maximum section width, an upper section above the maximum section width, and a lower section below the maximum section width, the tire comprising:
- a circumferential tread;
- at least one belt;
- a pair of sidewalls, each sidewall forming an outermost point of a side of the tire;
- an inner liner;
- a pair of bead portions, wherein each bead portion includes a bead core and a bead filler;
- at least one carcass ply extending circumferentially about the tire from one bead portion to the other, wherein the at least one carcass ply extends radially downward, axially inward of the bead filler, extends around the bead core, and continues radially upward, axially outward of the bead filler, and terminates at a turn-up end;
- at least two shoulder inserts, the at least two shoulder inserts including first and second shoulder inserts extending circumferentially about the tire, the first and second shoulder inserts provided between the inner liner and at least one of the sidewalls of the tire, wherein at least one lower end of the first and second shoulder inserts terminates in the upper section of the tire and upper ends of the first and second shoulder inserts terminate in the upper section of the tire radially downward of the at least one belt;
- a chafer extending axially outward from the inner liner towards one of the sidewalls and having a curved portion curving radially upward along an axially outer portion of the bead core, wherein the sidewall is located axially outward from and radially below the chafer; and
- a sidewall gum strip extending radially upward from the curved portion of the chafer, wherein the sidewall gum strip is located axially between the at least one carcass ply turn-up end and at least a portion of the chafer such that an outer end of the chafer is axially outside the sidewall gum strip, and wherein the sidewall gum strip further comprises a radially lower end and a radially upper end, where the radially upper end terminates in the upper section of the tire.

10. The tire of claim 9, wherein the tire includes at least three carcass plies and wherein the at least two shoulder inserts axially separate the at least three carcass plies in the shoulder region.

11. The tire of claim 9, wherein at least one of the lower ends of the first and second shoulder inserts extend below the turn-up end of the at least one carcass ply.

12. The tire of claim 9, wherein the sidewall gum strip further comprises a radially lower end and a radially upper end, where the radially upper end terminates in the lower section of the tire.

13. The tire of claim 12, wherein the radially upper end of the sidewall gum strip terminates at a location below an apex of the bead filler.

* * * * *